Patented Nov. 20, 1934

1,981,589

UNITED STATES PATENT OFFICE 1,981,589

POINTER TYPE COURSE INDICATOR

Francis W. Dunmore, Washington, D. C., assignor to the Government of the United States, represented by the Secretary of Commerce Application October 25, 1932, Serial No. 639,469

2 Claims. (Cl. 177—352)

(Granted under the act of March 3, 1883, as amended April 30, 1928; 370 O. G. 757)

The invention described herein may be manufactured and used by or for the Government of the United States for governmental purposes only without the payment of any royalty thereon.

My invention relates to an apparatus for guiding mobile objects such as an airplane along the courses of a directive radio beacon of the double or triple modulation type.

This invention is an improvement on my prior invention in which course indications were given by observing visually the relative amplitudes of vibration of two adjacent reeds tuned to the modulation frequencies of the beacon.

In this invention the course indications are given by a zero-center pointer type instrument. The motions of the two reeds generate small alternating voltages, which, when rectified and passed in opposing polarities through the zero-center indicating instrument, serve to give course indications by the deflection of the indicating instrument needle in the direction of the airplane's deviation from the course.

A form of course selector switch is also provided which makes possible the use of this type of visual course indicator on any one of the courses of any beacon in such a manner that the instrument needle deflects in the same direction as the deviation of the airplane from the course, regardless of which course is being flown or the direction of flight. It is only necessary for the pilot to set the pointer of one switch to the class of beacon he is to fly and the pointer of the other switch to the color of the beacon course he is to fly, and to the direction of flight along this course, i. e., to "To" or "From" the radio beacon. This first switch selects the proper two-reed converter units, and the second switch connects the outputs in the proper polarity to the zero-center indicating instrument, thus causing the needle to deflect in the direction of deviation of the airplane from the course.

A form of signal volume indicator is described which tells the pilot that the reeds of the reed filter are functioning, as the zero center course indicator does not give this indication when on course. Other uses for and advantages which may be gained by the use of my invention will be more clearly understood by reference to the following description and accompanying diagrammatic drawings.

Figure 1:
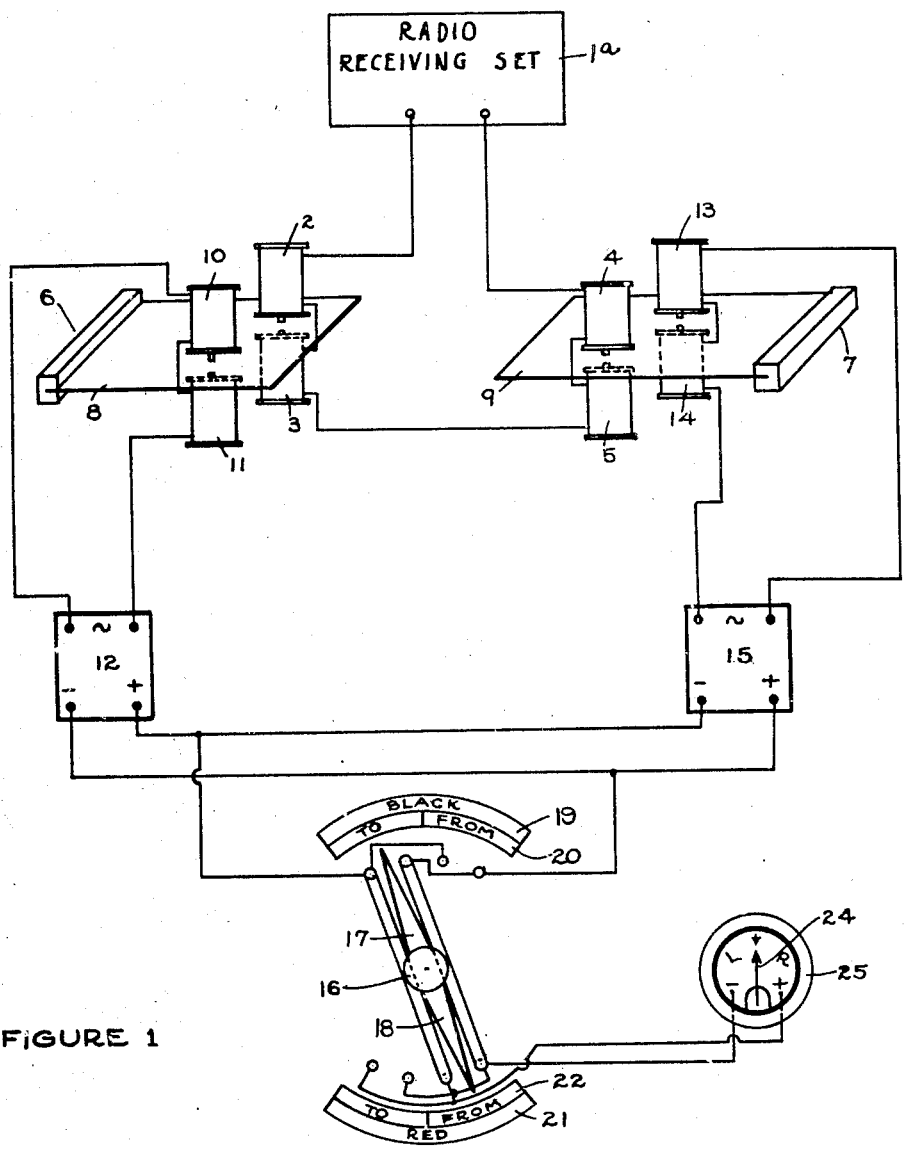
Figure 1 is a circuit diagram of my apparatus showing course selector switch.

In Figure 1 which shows one arrangement of my circuits: Terminals 1 are connected to the radio receiving set 1a which delivers the double modulation signal from the beacon to driving coils 2, 3, 4 and 5 of filter units 6 and 7. A reed 8 in unit 6 is tuned to, say, 65 cycles and a reed 9 in unit 7 is tuned to, say, 86⅔ cycles. The pick-up coils 10 and 11 are connected to a rectifier 12 and pick-up coils 13 and 14 are connected to a rectifier 15. The direct current outputs from these two rectifiers are connected in opposition to course selector switch 16. The filter units 6 and 7 may be replaced by others of different frequency as they are the plug-in type. Thus a type C or type D beacon may be flown the same switch 16 being used. The selector switch 16 is a reversing switch with output connected to zero center course indicating instrument 25. Switch 16 carries two pointers 17 traveling over scales 19 and 20, and 18 traveling over scales 21 and 22. Scales 19 and 21 indicate the color of the courses and scales 20 and 22 indicate the direction of flight. If a pilot desires to fly to the beacon on a red course, he sets the red course pointer 18 to "To". The purpose of this type of switch 16 and the course color scales is to serve as a means for correctly indicating by deflection of needle 24 of a course indicating instrument 25 the direction of deviation of the airplane from the selected course.

Obviously, without a reversing switch 16 connected to the input of the course indicating instrument 25 and provided with suitable course and direction marking for the pilot's guidance, the needle 24 will not deflect in the direction of the deviation of the airplane on a selected course and any operation of the needle 24 would be meaningless and give no intelligent information.

Thus in the operation of the invention as shown in Figure 1, consider a double modulated beacon (well known in the art) providing the usual four courses. Call two opposite courses—red courses, and the other two opposite courses—black courses and which are at substantially right angles to the red courses. The pilot knows from consulting his aerial map that the black courses extend, say, east and west, and the red courses, north and south and that when going "to" a selected beacon, say, on a black course, the 86⅔ cycle modulation is on his right and the 65 cycle modulation is on his left. Should a pilot desire to fly "To" the beacon on a black course and assuming he is lost, in an attempt to orient himself he sets pointer 17 to read on the scale 19 and 20 "To—Black", and the pointer 18 to read on the scales 21 and 22 "From—Red". He finds a course, and follows it. If the course found is either of two just mentioned, in following it the indicator needle 24 will deflect to the right, when his airplane goes off course to the right, or to the left if his plane goes off course to the left. However, assuming that the needle 24 deflects reversely to the direction of deviation of the airplane from the course with the above stated setting of the pointers 17 and 18, the pilot knows from consulting the position of the pointers and their respective scales, 19, 20, 21 and 22, that he is either flying "from" the selected beacon on the "black" course or "to" the selected beacon on the "red" course. Now by glancing at his compass he knows instantly which of the latter courses he is on,—if flying, say, north, he knows he is on a "red" course headed "to" the beacon. This is so because—he could not be flying north and follow a black course which extends east and west, and he could not be flying "from" the beacon on a "red" course because his course indicator needle 24 deflected in the wrong direction when deviating off course with his pointer 18 set at "From—Red." Having found he is flying "To" the beacon on a "Red" course he sets his pointer 18 to read "To—Red" on scales 22 and 21 and proceeds to fly "To" the beacon his course indicator needle 24 deflecting in a direction corresponding to his course deviation.

Hence the pointers 17 and 18, and their associated scales, 19, 20, 21 and 22, operating with the polarity reversing switch permits the pilot without mental calculations or effort, to know by observation which course and direction he is flying and to maintain a desired course in conjunction with the instrument 25. While, I have made use of the wording "Black" and "Red" and "To" and "From" on the scales it is understood that any other indicia may be employed which will give the same information.

Figure 2:
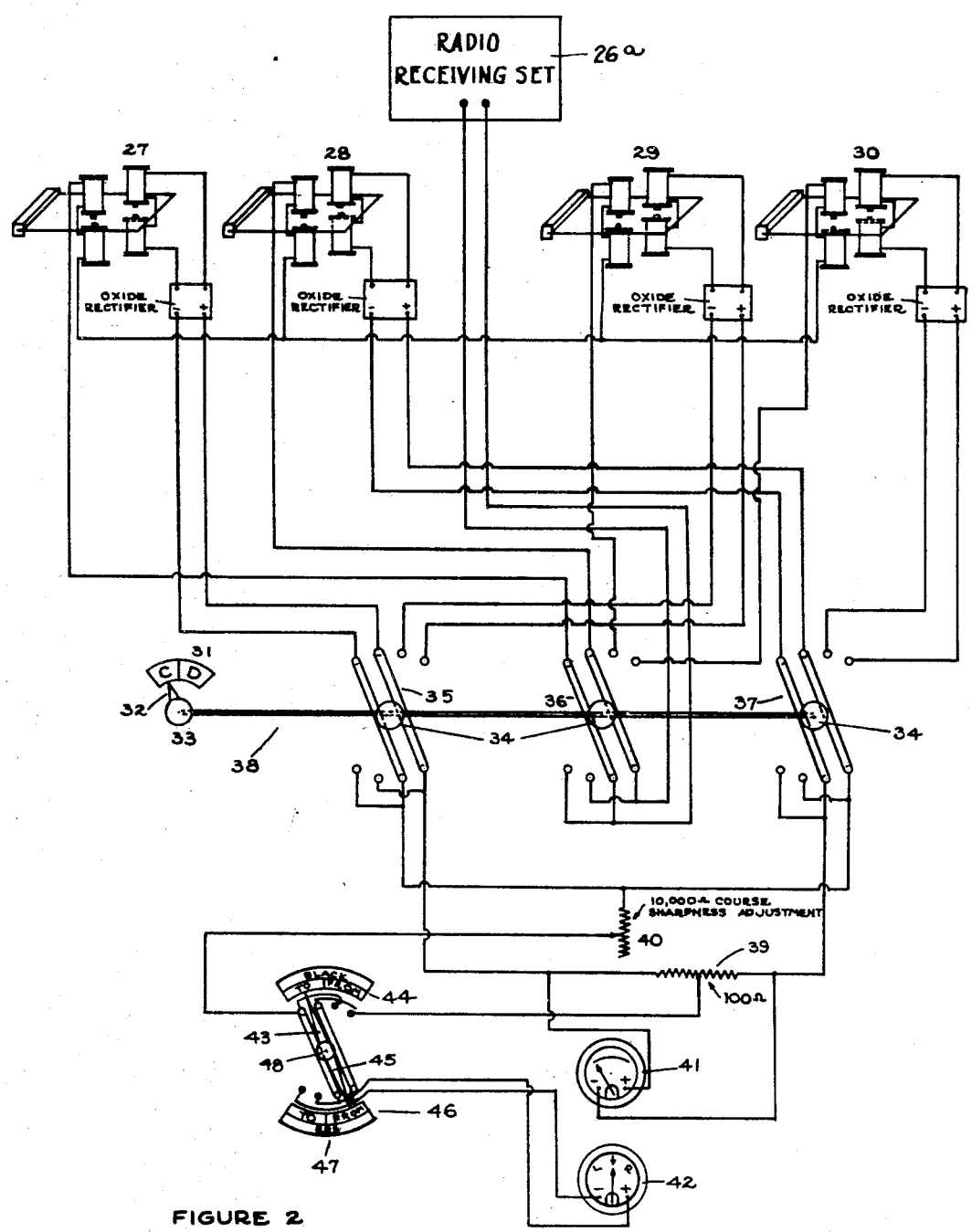
Figure 2 is a circuit diagram of a form of my apparatus including a plurality of double throw switches arranged to be operated in unison.

Figure 2 shows a more complete arrangement of my invention in which 27 and 28 are the filter units with reeds tuned to 65 cycles and 86⅔ cycles, respectively, and 29 and 30 and filter units with reeds tuned to, say 75 cycles and 100 cycles, respectively. A beacon selector switch 38 connects the output 27—28 or 29—30 to a course indicator 42 through a course selecting reversing switch 47. A pointer 32 rigidly connected to a handle 33 and switches 35, 36 and 37 are on the same shaft. A knob 48 carries pointers 43 and 45 which travel over scales 44 and 46. The reversing switch 47 serves as a means for selecting a course and operates with two pointers 43 and 45 over two color scales 44 and 46. The other set of terminals of this switch are connected to a course indicator 42. This may be a 200—0—200 microammeter. The direct current drop across an adjustable resistance 39 is applied to a volume indicator 41. This serves to give signal volume indication. This may be a 0—500 microammeter. A variable rheostat for course sharpness adjustment is identified by the numeral 40.

The operation of my system shown in Figure 2 is as follows: The pilot determines the class of beacon he is to fly on, i. e., whether class C or D. Assume it is class C. Pointer 32 is set on C of scale 31. This connects the output terminals 26 from the receiving set to the input terminals of filters 27 and 28 by means of switch 36. Switches 37 and 35 connect the output terminals of these two filters to course selector switch 47. Switch 38 is therefore the beacon selector switch. The polarity reversing switch 47, and its pointers 43 and 45, are operated in the same manner as is the polarity reversing switch 16 of Figure 1, described above. If the pilot is to fly "From" the beacon on a red course switch 47 is set as shown. The purpose of switch 47 is to permit the pointer of course indicator 42 to deflect in the direction of deviation of the plane from the course.

The purpose of the resistor 40, which is in series with course indicator 42, is to increase or decrease the sensitivity of indicator 42 thus broadening or sharpening the course indications given by this instrument. The $RI^2$ drop from resistor 39 is impressed on an instrument 42 which serves to indicate the signal level of the received signal since the outputs from 27 and 28 cause drops across 39 of the same polarity across the terminals of 41.

While I have described and illustrated different examples of my invention, I do not wish to be limited to these specific examples since modifications may be made both in the circuits and apparatus within the scope of my invention.

What I claim is:

1. In a course indicator, two pairs of terminals, means for impressing a unidirectional electrical potential across one pair of terminals, which potential has a certain nominal value when the indicator is on a course and decreases as a function of the distance of the indicator to one side of the course and increases as a function of the distance of the indicator to the other side of the course, means for impressing a second unidirectional electrical potential across the other pair of terminals which second potential has the same nominal value as said first unidirectional electrical potential when the course indicator is on the course, but increases as a function of the distance of the indicator to the side of the course where said first potential decreased, and decreases as a function of the distance of the indicator to the side of the course where said first potential increased, a resistor, means for connecting said pairs of terminals in aiding polarity in series with said resistor, indicating means which will indicate the magnitude and direction of an electrical potential, means connecting one terminal of said indicating means to the center of said resistor, means connecting the other terminal of said indicating means to the terminal of each of said pairs of terminals which is not connected to said resistor, means to indicate magnitude of electrical potential, means connecting the terminals of said last mentioned indicating means across the terminals of said resistor, whereby the last mentioned indicating means will give an indication of the combined intensities of said two undirectional electromotive forces.

2. In a course indicator two means responsive to two signals differing in character, said two responsive means each delivering an electrical potential to a rectifying means, said rectifying means each delivering a unidirectional electrical potential to a separate pair of terminals, said first unidirectional potential having a certain nominal value when said course indicator is on the course and decreasing as a function of the distance of the indicator to one side of the course and increasing as a function of the distance of the indicator to the other side of the course, said second unidirectional electrical potential having the same nominal value as said first unidirectional electrical potential when the course indicator is on the course, but increasing as a function of the distance of the indicator to the side of the course where said first potential decreased, and decreasing as a function of the distance of the indicator to the side of the course where said first potential increased, a resistor, means for connecting said pairs of terminals in aiding polarity in series with said resistor, indicating means which will indicate the magnitude and direction of an electrical potential, means connecting one terminal of said indicating means to the center of said resistor, means connecting the other terminal of said indicating means to the terminal of each of said pairs of terminals which is not connected to said resistor, means to indicate magnitude of electrical potential, means connecting the terminals of said last mentioned indicating means across the terminals of said resistor, whereby the last mentioned indicating means will give an indication of the combined intensities of said two unidirectional electromotive forces, and said first mentioned indicating means will give an indication of the difference with its polarity, in the intensities of said two unidirectional electromotive forces.

FRANCIS W. DUNMORE.